(12) United States Patent
Imao (10) Patent No.: US 8,179,948 B2
(45) Date of Patent: May 15, 2012

(54) RADIO SIGNAL DEMODULATING DEVICE

(75) Inventor: Masataka Imao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 349 days.

(21) Appl. No.: 12/666,242

(22) PCT Filed: Dec. 3, 2007

(86) PCT No.: PCT/JP2007/073304
§ 371 (c)(1),
(2), (4) Date: Dec. 22, 2009

(87) PCT Pub. No.: WO2009/028116
PCT Pub. Date: Mar. 5, 2009

(65) Prior Publication Data
US 2010/0189202 A1 Jul. 29, 2010

(30) Foreign Application Priority Data

Aug. 30, 2007 (JP) ................................ 2007-223784

(51) Int. Cl.
*H04B 1/00* (2006.01)
(52) U.S. Cl. ......... 375/148; 375/144; 375/349; 455/137
(58) Field of Classification Search .................. 375/141, 375/142, 144, 147, 148, 149, 326, 340, 344, 375/345, 346, 347, 349; 455/132–137, 226.1, 455/226.3, 264.1
See application file for complete search history.

(56) References Cited

U.S. PATENT DOCUMENTS

| 7,103,119 B2 * | 9/2006 | Matsuoka et al. ............ 375/347 |
| 7,652,527 B2 * | 1/2010 | Ido et al. ....................... 329/327 |
| 2003/0031234 A1 * | 2/2003 | Smee et al. .................... 375/147 |

FOREIGN PATENT DOCUMENTS

| EP | 0 883 207 A2 | 12/1998 |
| JP | 3-502515 A | 6/1991 |
| JP | 7-154129 A | 6/1995 |
| JP | 7-336130 A | 12/1995 |
| JP | 8-331468 A | 12/1996 |

(Continued)

OTHER PUBLICATIONS

Kikuma., Adaptive Antenna Technology. Tokyo: Ohmusha, 2003, pp. 40-47.

*Primary Examiner* — Dac Ha
(74) *Attorney, Agent, or Firm* — Birch, Stewart, Kolasch & Birch, LLP (57) ABSTRACT

It is an object of the present invention to provide a radio signal demodulating device in which fluctuation follow ability of transmission channel environment is improved. The radio signal demodulating device according to the present invention receives the amplitude of an information signal in which known pilot signals are multiplexed, as a radio signal modulated in proportion to the time change of frequency of a carrier wave The radio signal demodulating device according to the present invention includes a frequency converting unit, a signal combining unit, a first pilot signal extracting unit, a second pilot signal extracting unit, a first pilot orthogonal signal generating unit, a second pilot orthogonal signal generating unit, a first error signal generating unit, a first weight factor updating unit for calculating a weight factor to be used in the signal combining unit, by using a first pilot orthogonal signal and a first error signal obtained by the first error signal generating unit.

11 Claims, 9 Drawing Sheets

FOREIGN PATENT DOCUMENTS

| | | |
|---|---|---|
| JP | 10-126138 A | 5/1998 |
| JP | 10-341200 A | 12/1998 |
| JP | 2002-185374 A | 6/2002 |
| JP | 2004-328357 A | 11/2004 |
| JP | 2005-217849 A | 8/2005 |
| JP | 2006-50317 A | 2/2006 |
| JP | 2006-186421 A | 7/2006 |
| WO | WO-89/07864 A1 | 8/1989 |

* cited by examiner

F I G . 1 0

RADIO SIGNAL DEMODULATING DEVICE

TECHNICAL FIELD

The present invention relates to a radio signal demodulating device, and particularly relates to a radio signal demodulating device receiving as a radio signal in which the amplitude of an information signal, in which known pilot signals are multiplexed, is modulated in proportion to the time change of frequency of a carrier wave.

BACKGROUND ART

In a mobile receiving environment where a wave, in which a reflected wave, a diffracted wave, a scattered wave and the like are combined, arrives at a receiving point through various propagation paths, multipath fading where a receiving power level wildly fluctuates is generated in the radio signal demodulating device. The quality of a received signal deteriorates in the radio signal demodulating device due to this multipath fading. Therefore, in the radio signal demodulating device used in the mobile receiving environment, to improve the quality of the received signal is an essential technical problem. Specifically, it is necessary to develop a radio signal demodulating device suppressing interference from multipath fading and improving a Desire power to Un-desire power Ratio (DUR) of a demodulated signal.

A diversity technology with multiple antennas which can receive a desired signal effectively is widely practiced as a technology of reducing the influence of the multipath fading. In the diversity technologies, a switching diversity, which switches antenna output in accordance with a receiving power of each antenna, has a simple configuration so that it is most frequently used as a radio signal demodulating device in the mobile receiving environment.

As another diversity technology, an adaptive array antenna system, which independently controls the amplitude and phase of a signal received in each antenna element by a signal processing so as to adaptively perform the control of directional characteristics of the entire system, is under consideration. This system has characteristics of maximizing DUR of a desired signal as well as suppressing spurious waves, the characteristics depending on an algorithm for calculating a weight factor used for combining a signal.

In the mobile receiving environment, it is difficult to accurately recognize information regarding the arriving direction and arriving wave number of a received signal, so that the Minimum Mean Square Error (MMSE) method not requiring the aforementioned information is often used for this algorithm Furthermore, the algorithms of this MMSE contains a Constant Modulus Algorithm (CMA) as an algorithm of maximizing the DUR on the premise that a sending signal is a constant envelope signal such as a Frequency Modulation (FM) wave, a Phase Modulation (PM) wave and the like. This CMA is an algorithm on the basis of the principle that an envelope is constant.

The most distinctive feature of this CMA is that it is a blind algorithm not requiring replica of a desired signal. Thus, this CMA with a simple configuration is applicable to a radio signal demodulating device, and has been already put in use. It should be noted that the aforementioned switching diversity and the radio signal demodulating device using the CMA is described in detail in Patent Document 1 and Patent Document 2.

Also, the adaptive array antenna system is disclosed in Patent Document 3. This Patent Document 3 discloses an adaptive array antenna system compensating distortion of the phase and amplitude of an output signal by using pilot signals which are time-division-multiplexed to a data signal, to produce a reference signal and having the effect of preferably receiving a desired signal.

Patent Document 1: Japanese Patent Application Laid-Open No. H07-336130 (1995)

Patent Document 2: Japanese Patent Application Laid-Open No. 2005-217849

Patent Document 3: Japanese Patent Application Laid-Open No. H07-154129 (1995)

However, in the radio signal demodulating device using the conventional switching diversity, the phase of a signal is turned to be discontinuous along with the switching of an antenna element, thereby causing a problem of deteriorating a receiving performance. Further, in the radio signal demodulating device using the conventional switching diversity, there has been also a problem that even in a transmission channel environment where spurious waves are present, the spurious waves are combined without being suppressed.

The radio signal demodulating device using the conventional CMA takes time to converge to an optimum receiving state, and has a limit in convergence performance for the fluctuation of the transmission channel environment under the mobile receiving environment. Further, in the radio signal demodulating device using the conventional CMA, there has been a problem of receiving spurious waves when the power of the spurious waves is above the power of a signal desired to receive under the transmission channel environment where the spurious waves are present.

Also, the radio signal demodulating device employing the configuration of Patent Document 3 has a problem that the distortion of the phase and amplitude of the output signal are not compensated simultaneously when a data signal is not a complex signal (for example, a data signal is a signal obtained by demodulating a frequency-modulated signal).

DISCLOSURE OF INVENTION

The present invention has been made in view of the aforementioned problems, and has an object to provide a radio signal demodulating device for improving convergence performance for the fluctuation of a transmission channel environment.

An aspect of the present invention is intended for a radio signal demodulating device receiving as a radio signal in which the amplitude of an information signal, in which known pilot signals are multiplexed, is modulated in proportion to the time change of frequency of a carrier wave. The radio signal demodulating device includes: a frequency converting unit receiving the radio signal by a plurality of antennas and converting frequency of the radio signal received in each of the antennas into predetermined frequency so as to output as output signals, a signal combining unit multiplying each of the output signals obtained by the frequency converting unit by a weight factor so as to output the sum thereof as a combined output signal, a first pilot signal extracting unit extracting the pilot signals multiplexed in the output signals obtained by the frequency converting unit, a second pilot signal extracting unit extracting the pilot signals multiplexed in the combined output signals obtained by the signal combining unit, a first pilot orthogonal signal generating unit generating a signal orthogonal to a first pilot signal obtained by the first pilot signal extracting unit so as to output the signal as a first pilot orthogonal signal which is a complex signal, a second pilot orthogonal signal generating unit generating a signal orthogonal to a second pilot signal obtained by the second pilot signal extracting unit so as to output the signal as a second pilot orthogonal signal which is a complex signal, a first error signal generating unit outputting an error of the combined output signal with respect to the known pilot signal as a first error signal by using the second pilot orthogonal signal and a reference signal having the same frequency as the pilot signal; and a first weight factor updating unit calculating the weight factor used in the signal combining unit by using the first pilot orthogonal signal and the first error signal obtained by the first error signal generating unit.

According to the aspect of the present invention, the radio signal demodulating device updates an optimum weight factor with MMSE as the principle by using the pilot orthogonal signal obtained in the demodulating process of the radio signal, thereby producing the effect of solving the problem that spurious waves are erroneously received, in addition to improving convergence performance for the fluctuation of the transmission channel environment.

These and other objects, features, aspects and advantages of the present invention will become more apparent from the following detailed description of the present invention when taken in conjunction with the accompanying drawings.

BEST MODE FOR CARRYING OUT THE INVENTION (First Preferred Embodiment)

Figure 1:
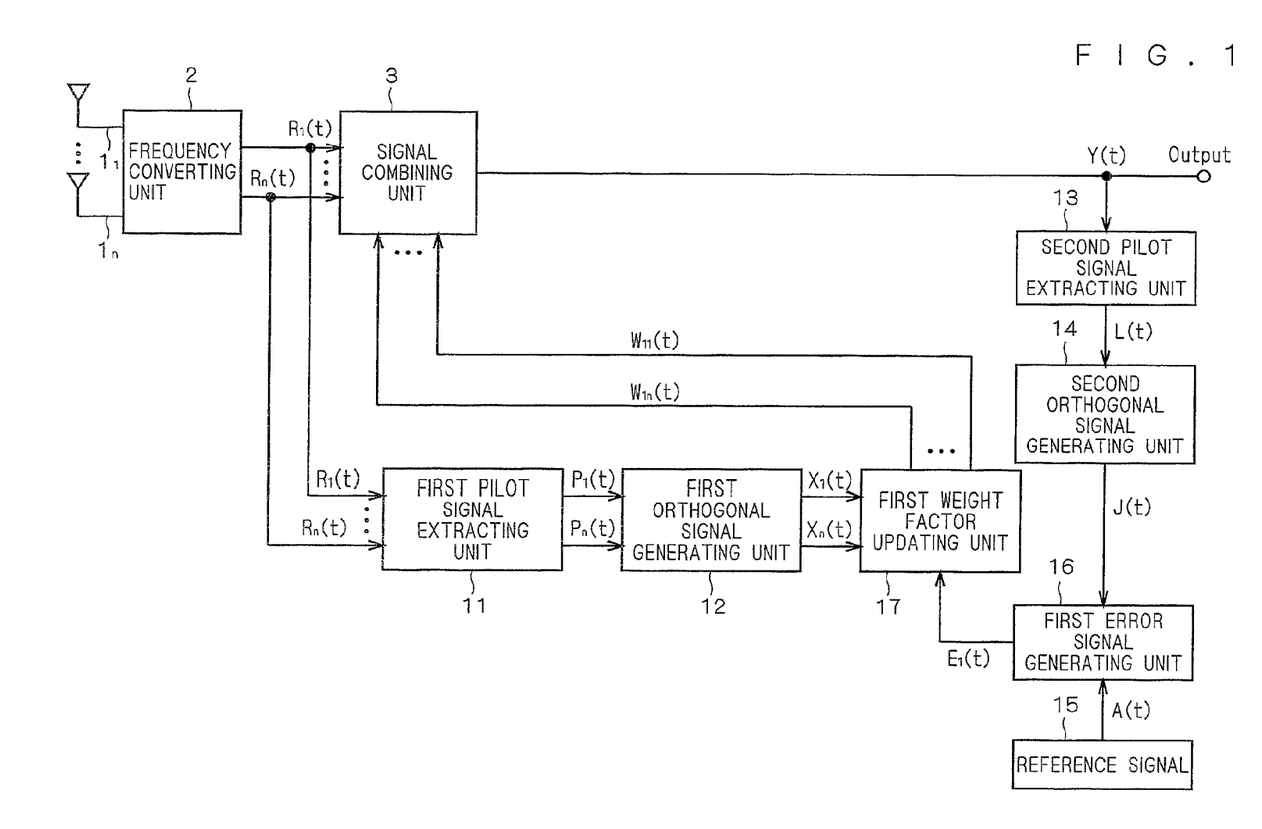
FIG. 1 is a block diagram of a radio signal demodulating device according to a first preferred embodiment of the present invention.

FIG. 1 shows a block diagram of a radio signal demodulating device according to the present preferred embodiment. The radio signal demodulating device shown in FIG. 1 has a function to receive as a radio signal in which the amplitude of an information signal, in which known pilot signals having predetermined frequency are multiplexed, is modulated in proportion to the time change of frequency of a carrier wave.

First, in the radio signal demodulating device shown in FIG. 1, radio signals received by a plurality of antennas $1_1$ to $1_n$ are inputted to a frequency converting unit 2, and the frequency converting unit 2 frequency-converts the received radio signals to output as the received signals $R_1(t)$ to $R_n(t)$. It should be noted that symbol (t) means a value of a signal in time t in the present specification.

Next, a signal combining unit 3 multiplies the received signals $R_1(t)$ to $R_n(t)$ outputted from the frequency converting unit 2 by the after-mentioned weight factor and outputs the sum thereof as a combined output signal Y(t). A specific calculation method performed in the signal combining unit 3 will be also described in detail later in the present preferred embodiment.

Subsequently, a first pilot signal extracting unit 11 extracts pilot signals $P_1(t)$ to $P_n(t)$ multiplexed in the received signals $R_1(t)$ to $R_n(t)$ outputted from the frequency converting unit 2, from those received signals.

Figure 2:
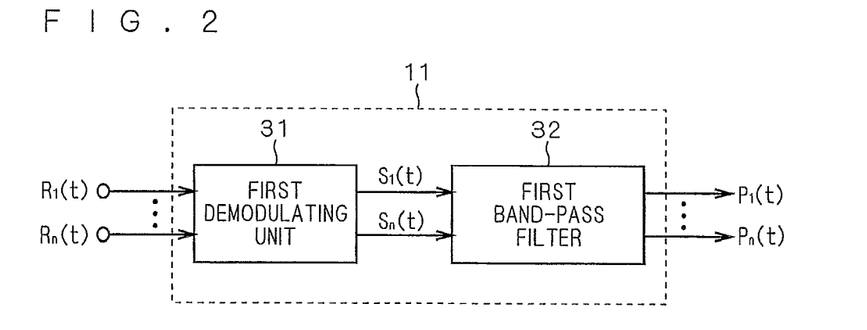
FIG. 2 is a block diagram of a first pilot signal extracting unit according to the first preferred embodiment of the present invention.

A configuration example of the first pilot signal extracting unit 11 is shown in FIG. 2. The first pilot signal extracting unit 11 shown in FIG. 2 includes a first demodulating unit 31 and a first band-pass filter 32. The first demodulating unit 31 demodulates the received signals $R_1(t)$ to $R_n(t)$ and reproduces information signals $S_1(t)$ to $S_n(t)$. The first band-pass filter 32 extracts first pilot signals $P_1(t)$ to $P_n(t)$ from the demodulated information signals $S_1(t)$ to $S_n(t)$.

The first demodulating unit 31 has a function to demodulate the information signals $S_1(t)$ to $S_n(t)$ with a method of detecting frequencies of the received signals $R_1(t)$ to $R_n(t)$ to be inputted and outputting an amplitude value in proportion to variation of those frequencies with respect to the time change, for example. Alternatively, the first demodulating unit 31 may have a function to demodulate the information signals $S_1(t)$ to $S_n(t)$ with a method of detecting phases of the received signals $R_1(t)$ to $R_n(t)$ to be inputted and outputting an amplitude value in proportion to variation of those phases with respect to the time change.

Fundamentally, the n-first demodulating units 31 having the aforementioned function are equipped and each of the first demodulating units 31 is to correspond to one input $R_i$ (i=1 to n) and one output $S_i$ (i=1 to n), but the n-first demodulating units 31 are shown as one block in FIG. 2.

The first band-pass filter 32 extracts signal components having specific frequencies from the information signals $S_1(t)$ to $S_n(t)$ as the first pilot signals $P_1(t)$ to $P_n(t)$. This first band-pass filter 32 may be configured, for example, by using a Finite Impulse Response (FIR) filter or an Infinite Impulse Response (IIR) filter whose pass band is a predetermined frequency band containing the frequencies of known pilot signals.

Fundamentally, the n-first band-pass filters 32 having the aforementioned configuration are equipped and each of the first band-pass filters 32 is to correspond to one input $S_i$ (i=1 to n) and one output $P_i$ (i=1 to n), but the n-first band-pass filters 32 are shown as one block in FIG. 2.

Next, a first orthogonal signal generating unit 12 outputs first pilot orthogonal signals $X_1(t)$ to $X_n(t)$ to be orthogonal to the first pilot signals $P_1(t)$ to $P_n(t)$ obtained from the first pilot signal extracting unit 11. These first pilot orthogonal signals $X_1(t)$ to $X_n(t)$ are complex signals, which are signals with in-phase signal components and orthogonal signal components being orthogonal to each other. The first orthogonal signal generating unit 12 may be provided by using a Hilbert transform filter, for example, or by using a differentiator, for example.

When the Hilbert transform filter is used as the first orthogonal signal generating unit 12, while the performance of the filter is improved and the orthogonality is getting higher as the number of taps in the filter increases, it causes the problem to increase the size of a circuit. Therefore, when setting a large number of taps is not possible due to restriction of the size of the circuit and the like, the first orthogonal signal generating unit 12 is configured by using a FM filter having a predetermined finite number of taps. Also, when a differentiator is used as the first orthogonal signal generating unit 12, it may be configured to calculate differences of input signals for each predetermined time interval, for example.

Fundamentally, the n-first orthogonal signal generating units 32 having the aforementioned configuration are equipped and each of the first orthogonal signal generating units 32 is to correspond to one input $P_i$ (i=1 to n) and one output $X_i$ (i=1 to n), but the n-first band-pass filters 32 are shown as one block in FIG. 1.

Next, a second pilot signal extracting unit 13 extracts a pilot signal L(t) multiplexed in a combined output signal Y(t) obtained by the signal combining unit 3 from the combined output signal.

Figure 3:
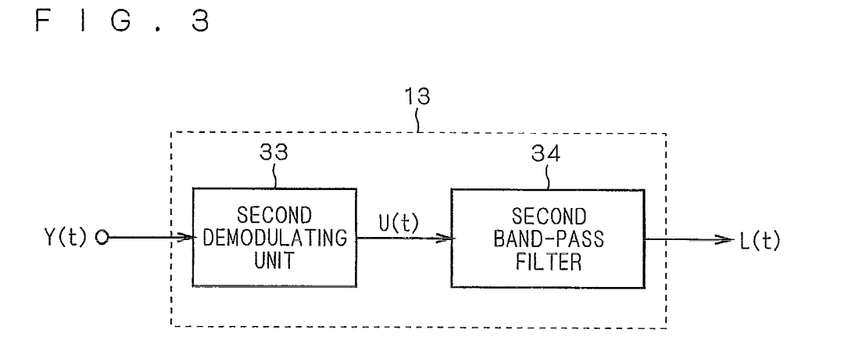
FIG. 3 is a block diagram of a second pilot signal extracting unit according to the first preferred embodiment of the present invention.

A configuration example of the second pilot signal extracting unit 13 is shown in FIG. 3. The second pilot signal extracting unit 13 shown in FIG. 3 includes a second demodulating unit 33 and a second band-pass filter 34. The second demodulating unit 33 demodulates the combined output signal Y(t) to reproduce an information signal U(t). The second band-pass filter 34 extracts a second pilot signal L(t) from the information signal U(t) obtained by the second demodulating unit 33.

The second demodulating unit 33 has a function to demodulate the information signal U(t) with a method of detecting a frequency of the combined output signal Y(t) to be inputted so as to output an amplitude value in proportion to variation of that frequency with respect to the time change, for example. Alternatively, the second demodulating unit 33 may have a function to demodulate the information signal U(t) with a method of detecting a phase of the combined output signal Y(t) to be inputted so as to output an amplitude value in proportion to variation of that phase with respect to the time change, for example.

The second band-pass filter 34 extracts signal components having specific frequencies from the information signal U(t) as the second pilot signal L(t). This second band-pass filter 34 may be configured, for example, by using a FIR filter or an IIR filter whose pass band is a predetermined frequency band containing the frequencies of known pilot signals.

Next, a second orthogonal signal generating unit 14 generates and outputs a second pilot orthogonal signal J(t) to be orthogonal to the second pilot signal L(t) obtained by the second pilot signal extracting unit 13. This second pilot orthogonal signal J(t) is a complex signal, which is a signal with an in-phase signal component and orthogonal signal component being orthogonal to each other. The second orthogonal signal generating unit 14 may be provided by using a Hilbert transform filter, for example, or by using a differentiator, for example.

When the Hilbert transform filter is used as the second orthogonal signal generating unit 14, while the performance of the filter is improved and the orthogonality is getting higher as the number of taps in the filter increases, it causes the problem to increase the size of a circuit. Therefore, when setting a large number of taps is not possible due to restriction of the size of the circuit and the like, the second orthogonal signal generating unit 14 is configured by using a FIR filter having a predetermined finite number of taps. Also, when a differentiator is used as the second orthogonal signal generating unit 14, it may be configured to calculate differences of input signals for each predetermined time interval, for example.

Next, a first error signal generating unit 16 generates a first error signal $E_1(t)$ by using the output J(t) of the second orthogonal signal generating unit 14 and a signal A(t) which is a reference signal 15. Here, the reference signal 15 is a signal A(t) having the same frequency as a known pilot signal. Then, the first error signal $E1(t)$ is calculated on the basis of the expression 1, and inputted to a first weight factor updating unit 17.

$$E_1(t)=J(t)-A(t) \qquad \text{[Expression 1]}$$

Next, the first pilot orthogonal signals $X_1(t)$ to $X_n(t)$ and the first error signal $E_1(t)$ are inputted to the first weight factor updating unit 17, and the first weight factor updating unit 17 operates so as to directly minimize an evaluation function $Q_1(t)$ shown in the expression 2. It should be noted that a symbol "Σ" in the expression 2 means the sum in the time i=1 to t, and f is referred to as a forgetting coefficient, meaning a constant number of no less than 0 and no more than 1. The forgetting coefficient f is a value determining to what extent the information on the received signals in the past should be remained, and the smaller this is set to be, the smaller the remaining effect will be.

$$Q_1(t) = \sum_{i=1}^{t} f^{t-i}|E_1(i)|^2 \qquad \text{[Expression 2]}$$

Figure 4:
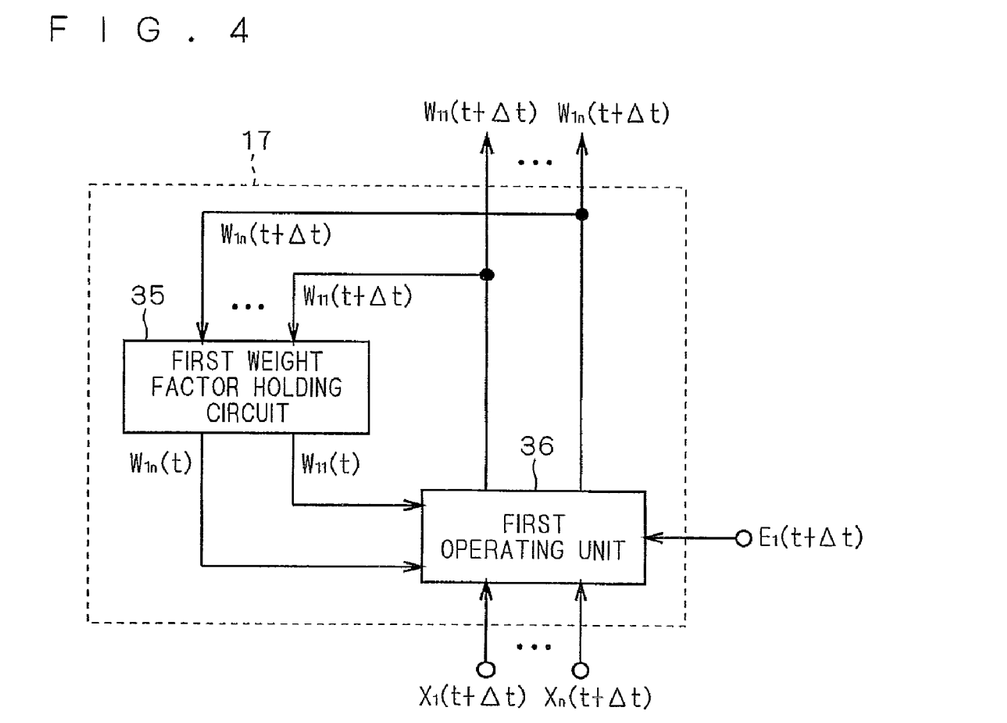
FIG. 4 is a block diagram of a first weight factor updating unit according to the first preferred embodiment of the present invention.

A configuration example of the first weight factor updating unit 17 is shown in FIG. 4. The first weight factor updating unit 17 shown in FIG. 4 includes a first weight factor holding circuit 35 and a first operating unit 36. The first operating unit 36 calculates first weight factors $W_{11}(t+\Delta t)$ to $W_{1n}(t+\Delta t)$ on the basis of the first pilot orthogonal signals $X_1(t)$ to $X_n(t)$ and the first error signal $E_1(t)$. Then the first weight factor holding circuit 35 holds the first weight factors $W_{11}(t+\Delta t)$ to $W_{1n}(t+\Delta t)$ calculated in the first operating unit 36. Next, the first weight factors $W_{11}(t+\Delta t)$ to $W_{1n}(t+\Delta t)$ held by the first weight factor holding circuit 35 are inputted again to the first operating unit 36 for a predetermined elapsed time so as to update the first weight factors $W_{11}(t+\Delta t)$ to $W_{1n}(t+\Delta t)$.

Specifically, the first operating unit 36 calculates a first weight difference value $D_1(t)$ for updating the first weight factor on the basis of the expression 3 by using the first pilot orthogonal signals $X_1(t+\Delta t)$ to $X_n(t+\Delta t)$ and the first error signal $E_1(t+\Delta t)$. Here, each of X(t) and $r_{XX}(t)$ is a value represented by the expressions 4 and 5, and H and $\Delta t$ in the expressions mean complex conjugate transpose and a small time, respectively.

$$D_1(t) = \frac{r_{XX}^{-1}(t)X(t+\Delta t)}{f + X^H(t+\Delta t)r_{XX}^{-1}(t)X(t+\Delta t)} \qquad \text{[Expression 3]}$$

$$X(t) = [X_1(t)X_2(t) \ldots X_n(t)]^H \qquad \text{[Expression 4]}$$

$$r_{XX}(t) = X(t)X^H(t) \qquad \text{[Expression 5]}$$

Next, the first weight factor is updated on the basis of the expression 6 by using the first weight factors $W_{11}(t)$ to $W_{1n}(t)$ held by the first weight factor holding circuit 35 and the first weight difference value $D_1(t)$. It should be noted that $W_1(t)$ is a weight vector represented by the expression 7, and * means complex conjugate. The first weight factor $W_1(t+\Delta t)$ obtained by the first weight factor updating unit 17 is inputted to the signal combining unit 3.

$$W_1(t+\Delta t)=W_1(t)+D_1(t)E_1^*(t+\Delta t) \quad \text{[Expression 6]}$$

$$W_1(t)=[W_{11}(t)W_{12}(t)\ldots W_{1n}(t)]^H \quad \text{[Expression 7]}$$

Finally, the signal combining unit 3 multiplies each of the inputted first weight factors $W_1(t+\Delta t)$ by the received signals $R_1(t)$ to $R_n(t)$ of the antennas $\mathbf{1}_1$ to $\mathbf{1}_n$ and outputs the sum of these multiplication results as the combined output signal $Y(t)$. That is, the signal combining unit 3 performs a calculation shown in the expression 8 to obtain the combined output signal $Y(t)$. It should be noted that $R(t)$ is a vector of the received signal represented by the expression 9. The signal combining unit 3 according to the present preferred embodiment multiplies the signals $R_1(t)$ to $R_n(t)$ received in each antenna by the weight factor to regard the sum thereof as the combined output signal $Y(t)$, thereby producing the effect of eliminating the discontinuity of signal phases.

$$Y(t)=W_1^H(t)R(t) \quad \text{[Expression 8]}$$

$$R(t)=[R_1(t)R_2(t)\ldots R_n(t)]^{Hi} \quad \text{[Expression 9]}$$

Here, in order to compare the performances of the conventional radio signal demodulating device and the radio signal demodulating device according to the present preferred embodiment, a configuration example of a device using a CMA which is one of the conventional radio signal demodulating devices (hereinafter, referred to as a CMA method device) will be described.

Figure 5:
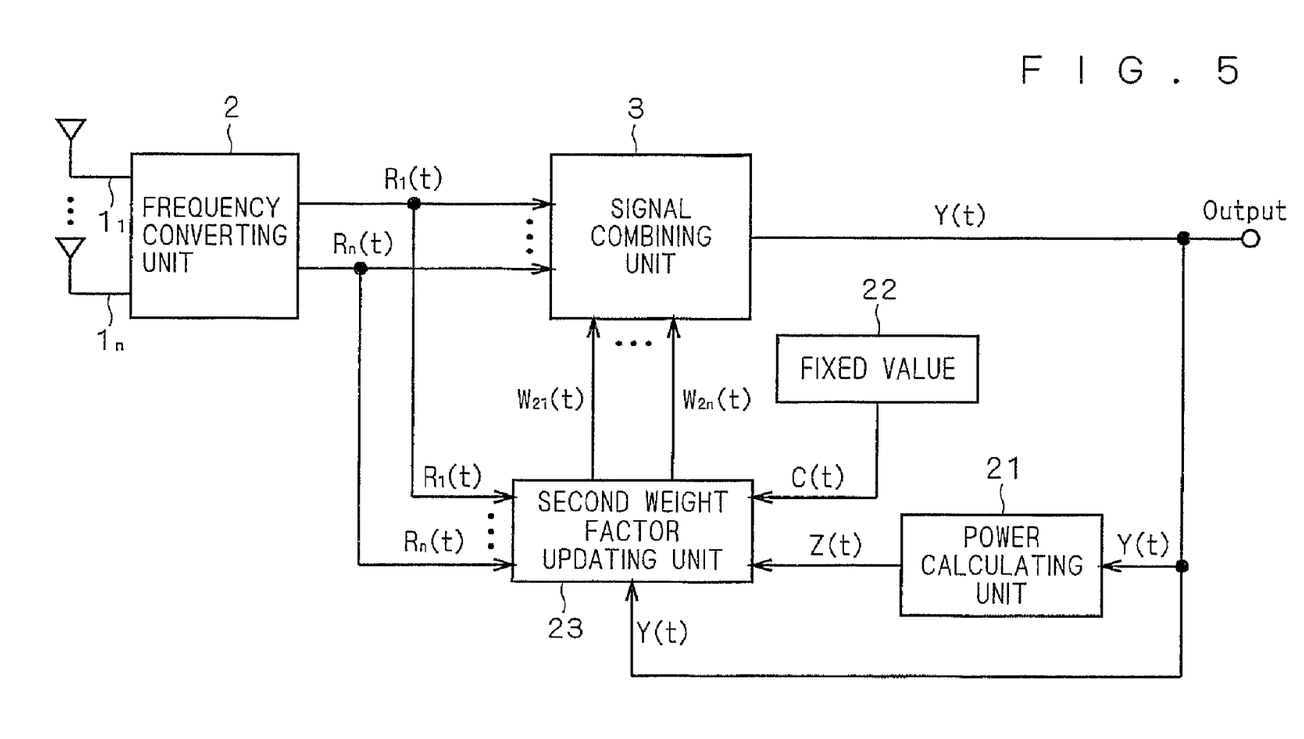
FIG. 5 is a block diagram of a radio signal demodulating device to be the premise of the present invention.

FIG. 5 is a block diagram of showing a configuration example of a CMA method device. In the CMA method device shown in FIG. 5, the same components as the radio signal demodulating signals shown in FIG. 1 are denoted by the same reference numbers, and the detailed description thereof will be omitted.

A power calculating part 21 shown in FIG. 5 calculates a combined power value $Z(t)$ of the combined output signal $Y(t)$ obtained by the signal combining unit 3 by using that signal to output to a second weight factor updating unit 23. The power calculating unit 21 performs the calculation shown in the expression 10, for example, to calculate the combined power value $Z(t)$.

$$Z(t)=|Y(t)|^2 \quad \text{[Expression 10]}$$

Next, the second weight factor updating unit 23 shown in FIG. 5 operates to directly minimize a value of an evaluation function $Q_2(t)$ shown in the expression 11 by using the combined power value $Z(t)$ obtained by the power calculating unit 21 and a predetermined value $C(t)$ outputted from a fixed value 22.

$$Q_2(t)=|Z(t)-C(t)^2|^2 \quad \text{[Expression 11]}$$

Figure 6:
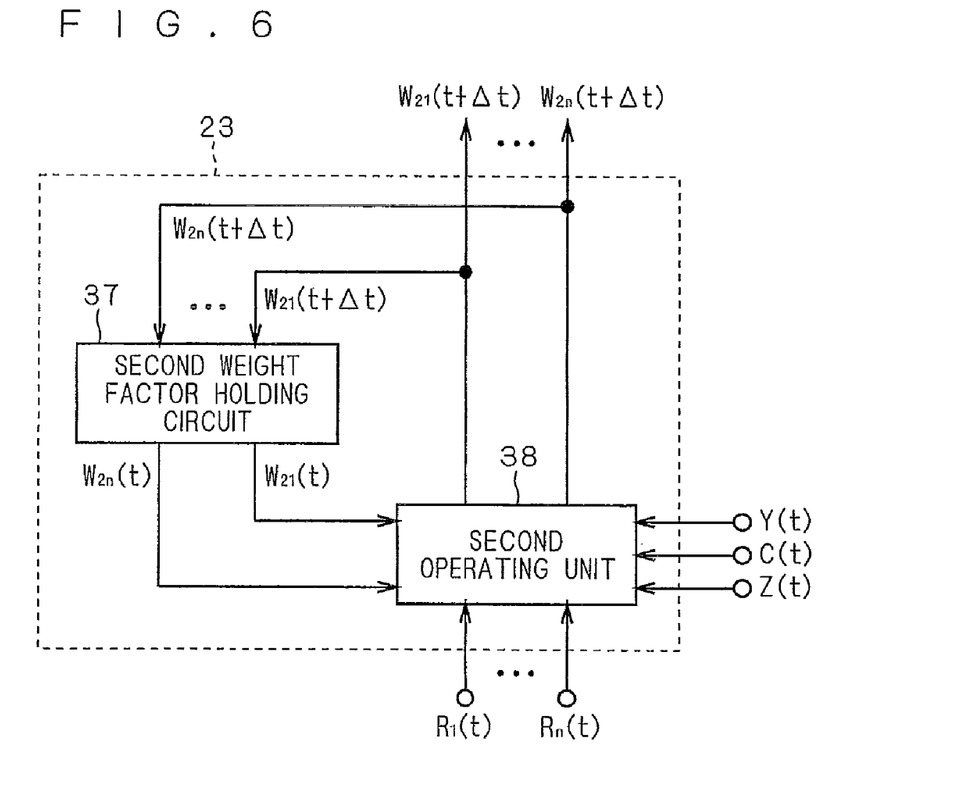
FIG. 6 is a block diagram of a second weight factor updating unit of the radio signal demodulating device to be the premise of the present invention.

Specifically, a configuration example of the second weight factor updating unit 23 will be shown in FIG. 6. The second weight factor updating unit 23 shown in FIG. 6 includes a second weight factor holding circuit 37 and a second operating unit 38. First, the second operating unit 38 calculates second weight factors $W_{21}(t+\Delta t)$ to $W_{2n}(t+\Delta t)$ on the basis of the combined power value $Z(t)$ and a predetermined value $C(t)$. Then, the second weight factor holding circuit 37 holds the second weight factors $W_{21}(t+\Delta t)$ to $W_{2n}(t+\Delta t)$ calculated by the second operating unit 38. Next, the second weight factors $W_{21}(t+\Delta t)$ to $W_{2n}(t+\Delta t)$ held by the second weight factor holding circuit 37 are inputted again to the second operating unit 38 for a predetermined elapsed time so as to update the second weight factors $W_{21}(t+\Delta t)$ to $W_{2n}(t+\Delta t)$.

First, the second operating unit 38 calculates a second weight difference value $D_2(t)$ for updating the second weight factor by the expression 12 by using the received signals $R_1(t)$ to $R_n(t)$, the combined output signal $Y(t)$, the combined power value $Z(t)$, and the predetermined value $C(t)$. Here, $\mu$ in the expression 12 means the step gain, which is a constant number controlling the speed of updating the weight factors.

$$D_2(t)=4\mu R(t)Y^*(t)\{Z(t)-C(t)^2\} \quad \text{[Expression 12]}$$

Next, the second weight factors are updated on the basis of the expression 13 by using the second weight factors $W_{21}(t)$ to $W_{2n}(t)$ held by the second weight factor holding circuit 37 and the second weight difference value $D_2(t)$. It should be noted that $W_2(t)$ is a weight vector represented by the expression 14. The second weight factor $W_2(t)$ obtained by the second weight factor updating unit 23 is outputted to the signal combining unit 3.

$$W_2(t+\Delta t)=W_2(t)-D_2(t) \quad \text{[Expression 13]}$$

$$W_2(t)=[W_{21}(t)W_{22}(t)\ldots W_{2n}(t)]^H \quad \text{[Expression 14]}$$

Finally, the signal combining unit 3 multiplies each of the received signals $R_1(t)$ to $R_n(t)$ of the antennas $\mathbf{1}_1$ to $\mathbf{1}_n$ by the second weight factor $W_2(t)$ and outputs the sum of these multiplication results as the combined output signal $Y(t)$. That is, the signal combining unit 3 performs the calculation shown in the expression 15 to obtain the combined output signal $Y(t)$.

$$Y(t)=W_2^H(t)R(t) \quad \text{[Expression 15]}$$

The CMA method device described above, in the process of obtaining the optimum weight factor, uses a method referred to as a steepest decent method as shown in the expressions 11 to 13 for updating the second weight factor on the basis of a value of the second error function (the evaluation function $Q_2(t)$ shown in the expression 11) that is currently obtained. In contrast, the radio signal demodulating device according to the present preferred embodiment, as shown in the expressions 2, 3, and 6, uses a method of a Recursive Least-Squares (RLS) algorithm for updating the first weight factor on the basis of all the values of the first error function (the evaluation function $Q_1(t)$ shown in the expression 2) calculated in the past. With respect to the RLS algorithm having a characteristic of the faster convergence speed compared to the CMA method, Adaptive Antenna Technology (by Nobuyoshi Kikuma, Ohmsha, pp. 40-47) have described in detail. As a result, the radio signal demodulating device according to the present preferred embodiment has the effect of improving the followability for transmission channel environment.

Further, in the radio signal demodulating device according to the present preferred embodiment, since the first and second orthogonal signal generating units 12, 13 are prepared for generating a pilot orthogonal signal, pilot signals are surely complex-valued, and the method of receiving a signal obtained by frequency-converting an information signal in which known pilot signals are multiplexed, as a radio signal, produces the effect of compensating distortion of the phase and amplitude of the radio signal simultaneously.

Furthermore, the radio signal demodulating device according to the present preferred embodiment effectively updates the optimum weight factor with MMSE as the principle by using the pilot orthogonal signals obtained in the process of demodulating the radio signal, thereby solving the problem to erroneously receive spurious waves and producing the effect of further more improving the receiving performance compared to the CMA method, in addition to the aforementioned effect.

(Second Preferred Embodiment)

Figure 7:
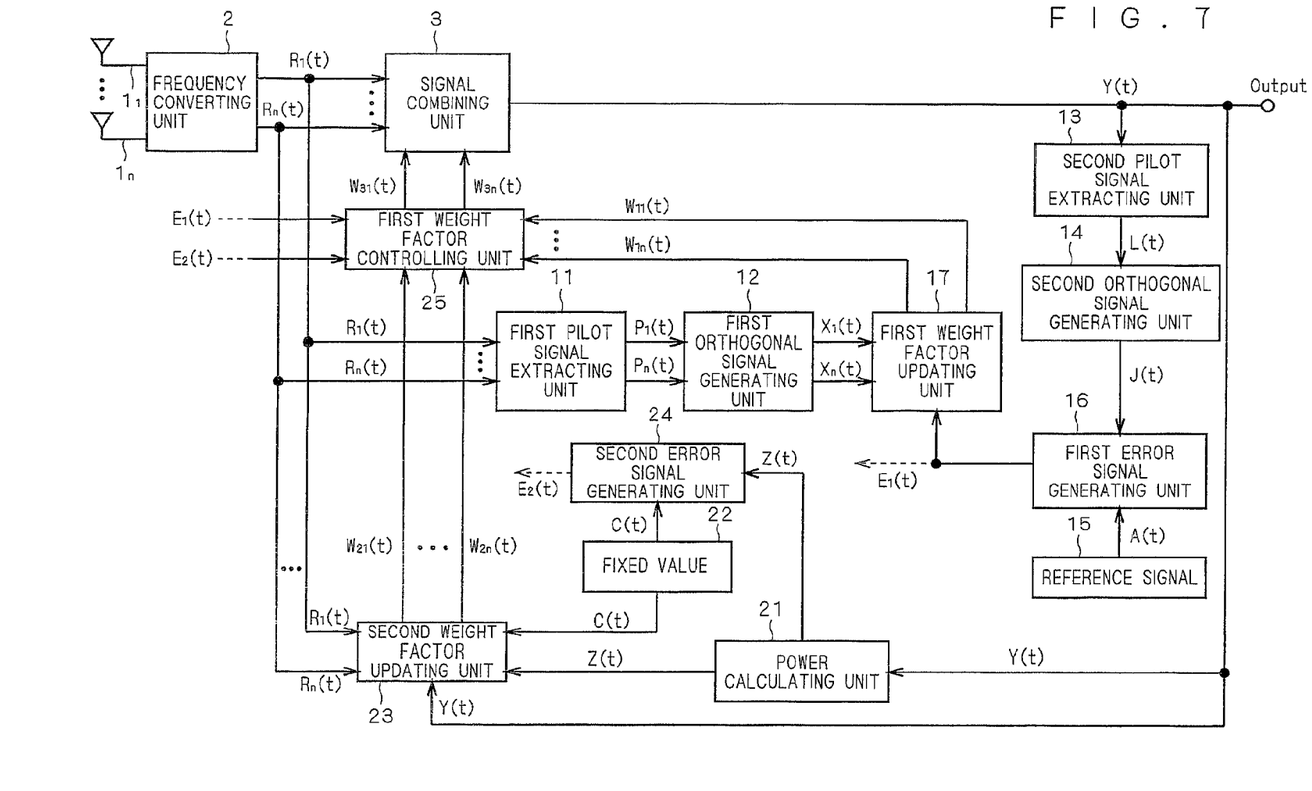
FIG. 7 is a block diagram of a radio signal demodulating device according to a second preferred embodiment of the present invention.

FIG. 7 shows a block diagram of a radio signal demodulating device according to a second preferred embodiment. The radio signal demodulating device shown in FIG. 7 is different from the radio signal demodulating device shown in FIG. 1 in including a power calculating unit 21, a second weight factor updating unit 23, a second error signal generating unit 24, and a first weight factor controlling unit 25. The power calculating unit 21 calculates a combined power value $Z(t)$ of a combined output signal $Y(t)$. The second weight factor updating unit 23 calculates second weight factors $W_{21}(t)$ to $W_{2n}(t)$ on the basis of received signals $R_1(t)$ to $R_n(t)$, the combined output signal $Y(t)$, the combined power value $Z(t)$, and a predetermined value $C(t)$ of a fixed value 22. The second error signal generating unit 24 generates a second error signal $E_2(t)$ on the basis of the combined power value $Z(t)$ and the predetermined value $C(t)$. The first weight factor controlling unit 25 outputs third weight factors $W_{31}(t)$ to $W_{3n}(t)$ for multiplying each of the received signals, on the basis of the first weight factors $W_{11}(t)$ to $W_{1n}(t)$ and the second weight factors $W_{21}(t)$ to $W_{2n}(t)$.

In the radio signal demodulating device shown in FIG. 7, the same components as those included in the radio signal demodulating device shown in FIG. 1 and the CMA method device shown in FIG. 5 are denoted by the same reference numbers, omitting the detailed description. Thus, the second error signal generating unit 24 and the first weight factor controlling unit 25 will be described in detail below.

First, the second error signal generating unit 24 calculates the second error signal $E_2(t)$ on the basis of the expression 16 by using the combined power value $Z(t)$ in the power calculating unit 21 and the predetermined value $C(t)$. The calculated second error signal $E_2(t)$ is inputted to the first weight factor controlling unit 25.

$$E_2(t) = C(t) - Z(t)^{1/2} \qquad \text{[Expression 16]}$$

The first weight factor controlling unit 25 outputs the third weight factors $W_{31}(t)$ to $W_{3n}(t)$ for multiplying each of the received signals, by using the first weight factors $W_{11}(t)$ to $W_{1n}(t)$, the first error signal $E_1(t)$, the second weight factors $W_{21}(t)$ to $W_{2n}(t)$, and the second error signal $E_2(t)$. Specifically, a configuration example of the first weight factor controlling unit 25 is shown in FIG. 8.

Figure 8:
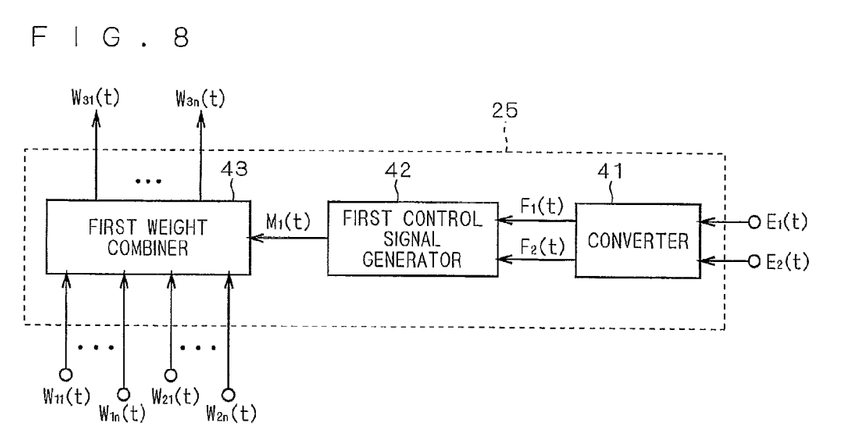
FIG. 8 is a block diagram of a first weight factor controlling unit according to the second preferred embodiment of the present invention.

The first weight factor controlling unit 25 shown in FIG. 8 includes a converter 41, a first control signal generator 42, and a first weight combiner 43. First, the converter 41 converts the first error signal $E_1(t)$ and the second error signal $E_2(t)$ into converted signals $F_1(t)$ and $F_2(t)$ to output to the first control signal generator 42.

As a specific converting method in the converter 41, there is a method of outputting envelope values of the first error signal $E_1(t)$ and the second error signal $E_2(t)$ as the converted signals $F_1(t)$ and $F_2(t)$, for example. As an alternative method, there is a method of outputting power values of the first error signal $E_1(t)$ and the second error signal $E_2(t)$ as the converted signals $F_1(t)$ and $F_2(t)$, for example. Further, the converter 41 may have a function to calculate an average value in the specified time section, and when having such a function, a time average value and a variance of the envelope values or the power values of the first error signal $E_1(t)$ and the second error signal $E_2(t)$ may be outputted as the converted signals $F_1(t)$ and $F_2(t)$.

Next, the first control signal generator 42 calculates an output signal $M_1(t)$ so as to satisfy the expression 17, for example, and outputs the output signal $M_1(t)$ to the first weight combiner 43.

$$M_1(t) = \frac{F_1(t)}{F_1(t) + F_2(t)} \qquad \text{[Expression 17]}$$

The first control signal generator 42 calculates not only by the expression 17, but may calculate the output signal $M_1(t)$ so as to satisfy the expression 18, for example. It should be noted that the symbols of Max( ) and Num( ) in the expression 18 are functions given by each of the expressions 19, 20, and 21.

$$M_1(t) = \text{Num}\{\text{Max}(F_1(t), F_2(t))\} \qquad \text{[Expression 18]}$$

$$\text{Max}(a,b) = a \ (a \geq b) \qquad \text{[Expression 19]}$$

$$\text{Max}(a,b) = b \ (a < b) \qquad \text{[Expression 20]}$$

$$\text{Num}(F_n(t)) = n \qquad \text{[Expression 21]}$$

Next, the first weight combiner 43 controls the first weight factors $W_{11}(t)$ to $W_{1n}(t)$ and the second weight factors $W_{21}(t)$ to $W_{2n}(t)$ on the basis of the output signal $M_1(t)$ of the first control signal generator 42 to output the third weight factors $W_{31}(t)$ to $W_{3n}(t)$ for multiplying each of the received signals.

Specifically, the first weight combiner 43 is capable of calculating the third weight factors $W_{31}(t)$ to $W_{3n}(t)$ by using the expression 22, for example, when a value of the output signal $M_1(t)$ is obtained by the expression 17. The calculated third weight factors $W_{31}(t)$ to $W_{3n}(t)$ are inputted to the signal combining unit 3.

$$[W_{31}(t) W_{32}(t) \ldots W_{3n}(t)]^H = M_1 [W_{11}(t) W_{12}(t) \ldots W_{1n}(t)]^H + (1-M_1)[W_{21}(t) W_{22}(t) \ldots W_{2n}(t)]^H \qquad \text{[Expression 22]}$$

Further, the first weight combiner 43 may calculate the third weight factors $W_{31}(t)$ to $W_{3n}(t)$ by using the expressions 23 or 24, for example, when a value of the output signal $M_1(t)$ is obtained by the expression 18.

$$[W_{31}(t) W_{32}(t) \ldots W_{3n}(t)]^H = [W_{11}(t) W_{12}(t) \ldots W_{1n}(t)]^H \ (M_1=1) \qquad \text{[Expression 23]}$$

$$[W_{31}(t) W_{32}(t) \ldots W_{3n}(t)]^H = [W_{21}(t) W_{22}(t) \ldots W_{2n}(t)]^H \ (M_1=2) \qquad \text{[Expression 24]}$$

Finally, the third weight factors $W_{31}(t)$ to $W_{3n}(t)$ obtained by the first weight factor controlling unit 25 are multiplied to each of the received signals $R_1(t)$ to $R_n(t)$ of the antennas $1_1$ to $1_n$ in the signal combining unit 3, and the sum of these multiplication results is outputted as the combined output signal $Y(t)$. That is, the signal combining unit 3 performs the calculations shown in the expressions 25 and 26 to obtain the combined output signal $Y(t)$.

$$Y(t) = W_3^H(t) R(t) \qquad \text{[Expression 25]}$$

$$W_3(t) = [W_{31}(t) W_{32}(t) \ldots W_{3n}(t)]^H \qquad \text{[Expression 26]}$$

Since the first weight factor updating unit 17 shown in FIG. 1 operates with the first pilot orthogonal signals $X_1(t)$ to $X_n(t)$ as input signals, there is a possible case that desirable operations are not conducted depending on the receiving environment or the characteristics of the radio transmission channel. For instance, when the frequency components in which pilot signals are multiplexed rarely appears in the demodulated signals due to the frequency selectivity fading environment, it is considered that desirable operations are not conducted in the first weight factor updating unit 17 shown in FIG. 1.

On the other hand, since the second weight factor updating unit 23 shown in FIG. 7 according to the present preferred embodiment operates with the received signals $R_1(t)$ to $R_n(t)$ as input signals, it operates independently of the quality of the pilot signals multiplexed in the received signals.

Therefore, when the frequency components in which the pilot signals are multiplexed rarely appears in the demodulated signals, it is considered that the value of the first error signal $E_1(t)$ is significantly larger than that of the second error signal $E_2(t)$. Thus, the radio signal demodulating device according to the second preferred embodiment selects the first weight factors $W_{11}(t)$ to $W_{1n}(t)$ or the second weight factors $W_{21}(t)$ to $W_{2n}(t)$ by monitoring the first error signal $E_1(t)$ and the second error signal $E_2(t)$ in the first weight factor controlling unit 25, further improving the receiving performance. More specifically, when determining that the first error signal $E_1(t)$ is not so larger than the second error signal $E_2(t)$, the first weight factor controlling unit 25 regards the pilot signals as having sufficiently large power, and then, selects the first weight factors $W_{11}(t)$ to $W_{1n}(t)$. In contrast, when determining that the first error signal $E_1(t)$ is significantly larger than the second error signal $E_2(t)$, the first weight factor controlling unit 25 regards the pilot signals as not having sufficient power, and then, selects the second weight factors $W_{21}(t)$ to $W_{2n}(t)$.

(Third Preferred Embodiment)

Figure 9:
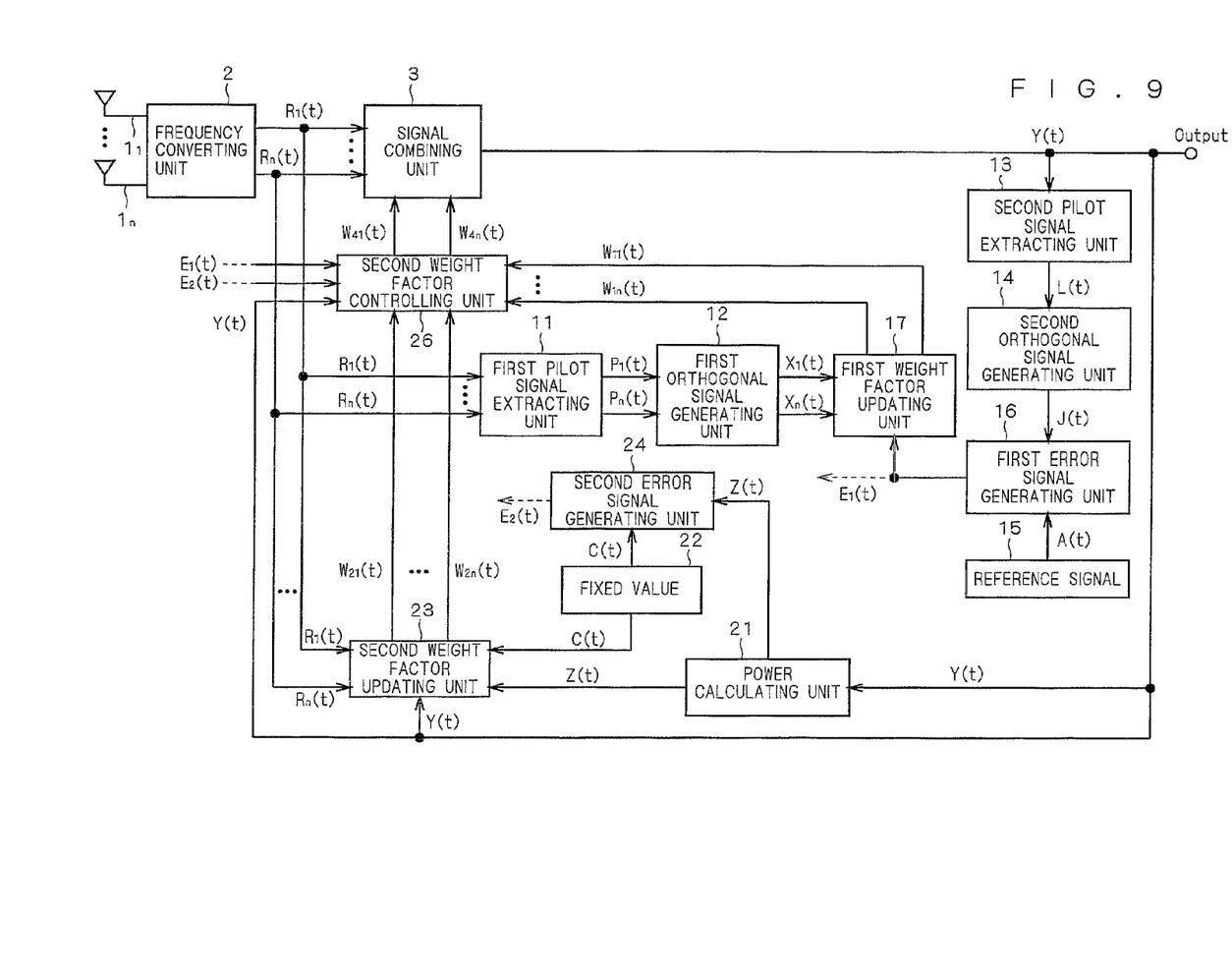
FIG. 9 is a block diagram of a radio signal demodulating device according to a third preferred embodiment of the present invention.

FIG. 9 shows a block diagram of a radio signal demodulating device according to the present preferred embodiment.

The radio signal demodulating device shown in FIG. 9 is different in providing a second weight factor controlling unit 26, substituting for the first weight factor controlling unit 25 of the radio signal demodulating device shown in FIG. 7. This second weight factor controlling unit 26 is different from the first weight factor controlling unit 25 in that the combined output signal $Y(t)$ is inputted in addition to the input signals of the first weight factor controlling unit 25.

In the radio signal demodulating device shown in FIG. 9, the same components as those included in the radio signal demodulating device shown in FIG. 7 are denoted by the same reference numbers, omitting the detailed description. Thus, the second weight factor controlling unit 26 will be described in detail below.

The first weight factors $W_{11}(t)$ to $W_{1n}(t)$, the first error signal $E_1(t)$, the second weight factors $W_{21}(t)$ to $W_{2n}(t)$, the second error signal $E_2(t)$, and the combined output signal $Y(t)$ are inputted to the second weight factor controlling unit 26. Then, the second weight factor controlling unit 26 calculates fourth weight factors $W_{41}(t)$ to $W_{4n}(t)$ for multiplying each of the received signals on the basis of these inputs. Specifically, a configuration example of the second weight factor controlling unit 26 is shown in FIG. 10.

Figure 10:
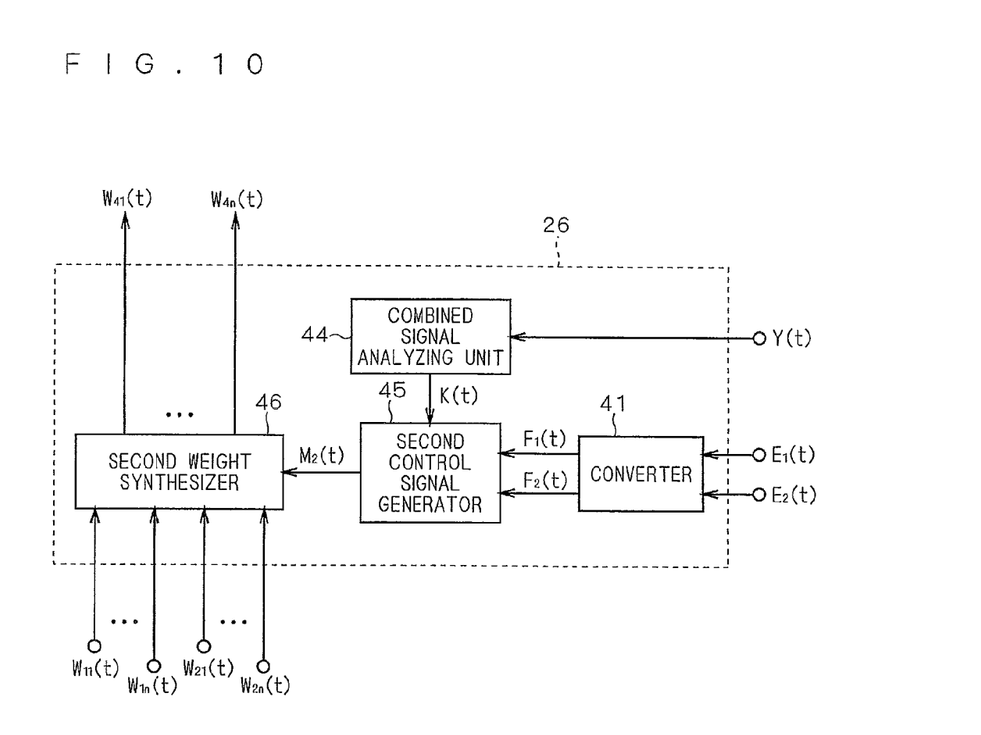
FIG. 10 is a block diagram of a first weight factor controlling unit according to a third preferred embodiment of the present invention.

In the second weight factor controlling unit 26 shown in FIG. 10, the same components as those included in the first weight factor controlling unit 25 shown in FIG. 8 are denoted by the same reference numbers, omitting the detailed description. This second weight factor controlling unit 26 includes a converter 41 having the same function as that in the second preferred embodiment, a combined signal analyzing unit 44 performing a signal analysis with the combined output signal $Y(t)$ as an input, a second control signal generator 45, and a second weight combiner 46.

The combined signal analyzing unit 44 analyzes the signal quality of the combined output signal $Y(t)$. Specifically, there is a method of analyzing an envelope value or a power value of the combined output signal $Y(t)$ and outputting the value of this analyzed signal as $K(t)$, for example. For instance, as an analyzed signal, the difference between the envelope value of the combined output signal $Y(t)$ and a predetermined envelope value may be outputted as $K(t)$. Further, the combined signal analyzing unit 44 may have a memory for analyzing the change of a signal in a predetermined time section. In this case, a variance of the envelope value and power value of the combined output signal $Y(t)$, or a variance of the difference between the envelope value of the combined output signal $Y(t)$ and a predetermined envelope value may be outputted as $K(t)$.

One of the examples of a circuit configuration outputting the variance of the difference between the envelope value of the combined output signal $Y(t)$ and a predetermined envelope value as $K(t)$ in the combined signal analyzing unit 44 will be described below. In the following description, the variance $K(t)$ of the difference between the envelope value of the combined output signal $Y(t)$ and a predetermined envelope value is referred to as simply the variance $K(t)$.

The first weight factor updating unit 17 according to the second preferred embodiment operates so as to bring the combined output signal $Y(t)$ near a signal $A(t)$ which is a reference signal. Therefore, a value of the error signal $E_1(t)$ changes as time elapses, and a value of the combined output signal $Y(t)$ changes accordingly.

To be more specific, for instance, when a period of a pilot signal is T, and delay time of a delay wave to a direct wave is shorter than the period T of the pilot signal, the first weight factor updating unit 17 updates the weight factor to obtain a signal with the delay time of the delay wave corresponding to 0. Then, the first weight factor updating unit 17 maximizes DUR of the combined output signal $Y(t)$ by minimizing the first error signal $E_1(t)$. Thus, when the first error signal $E_1(t)$ gets smaller as time elapses, the variance $K(t)$ gets smaller and the DUR of the combined output signal $Y(t)$ gets larger. On the other hand, when the first error signal $E_1(t)$ gets larger, the variance $K(t)$ gets larger and the DUR of the combined output signal $Y(t)$ gets smaller.

However, when the delay time of the delay wave to the direct wave is longer than the period T of the pilot signal, the operation as described above may not possibly be conducted. One example of those will be described in the following. First, when the delay time of the delay wave to the direct wave is 5T/2, the first weight factor updating unit 17 updates the weight factor to obtain a signal with the delay time of the delay wave corresponding to 2T (=4T/2). At this time, even if the first error signal $E_1(t)$ tends to get smaller as time elapses, the variance $K(t)$ does not gets smaller as described above and the DUR of the combined output signal $Y(t)$ does not get larger. Accordingly, when the delay time of the delay wave to the direct wave is longer than the period T of the pilot signal, the demodulation of the radio signal is not correctly performed, and a value of the variance $K(t)$ is larger than that in the aforementioned case.

On the other hand, since the second weight factor updating unit 23 operates with the received signals $R_1(t)$ to $R_n(t)$ as the input signals, it operates independently of the quality of the pilot signals multiplexed in the received signals $R_1(t)$ to $R_n(t)$. That is, even when a period of the pilot signal is T and the delay time of the delay wave to the direct wave is 5T/2, for example, the second weight factor updating unit 23 continues to update the weight factor to obtain a signal with the delay time of the delay wave corresponding to 0. Therefore, when the second error signal $E_2(t)$ tends to get smaller as time elapses, the second weight factor updating unit 23 operates such that the DUR of the combined output signal $Y(t)$ gets larger.

Accordingly, in the second weight factor controlling unit 26 according to the present preferred embodiment, the second control signal generator 45 generates a control signal $M_2(t)$ on the basis of a converted signal $F_1(t)$ obtained from the first error signal $E_1(t)$, a converted signal $F_2(t)$ obtained from the second error signal $E_2(t)$, and the variance $K(t)$ of the combined signal analyzing unit 44. Then, in the second weight factor controlling unit 26 according to the present preferred embodiment, the control signal $M_2(t)$ is generated by detecting the presence or absence of the delay wave having the delay time longer than the period T of the pilot signal, thereby producing the effect of further improving the quality of the combined output signal $Y(t)$.

To be more specific, in the case that the variance $K(t)$ gets smaller (gets larger) when the converted signal $F_1(t)$ gets smaller (gets larger), the second weight factor controlling unit 26 determines that the delay wave having the delay time longer than the period T of the pilot signal is absent, and generates the control signal $M_2(t)$. Then, the second weight factor combiner 46 determines that the quality of the combined output signal $Y(t)$ is improved, on the basis of the control signal $M_2(t)$, and selects the first weight factors $W_{11}(t)$ to $W_{1n}(t)$.

On the other hand, in the case that the variance $K(t)$ gets larger (gets smaller) or changes little when the converted signal $F_1(t)$ gets smaller (gets larger), the second weight factor controlling unit 26 determines that the delay wave having the delay time longer than the period T of the pilot signal is present, and generates the control signal $M_2(t)$. Then, the second weight combiner 46 determines that the quality of the combined output signal $Y(t)$ is not improved, on the basis of the control signal $M_2(t)$, and selects the second weight factors $W_{21}(t)$ to $W_{2n}(t)$.

The radio signal demodulating device according to the present preferred embodiment has the effect of suppressing the deterioration of the signal quality caused by receiving the delay wave having the delay time exceeding the period T of the pilot signal, and further improving the receiving performance by generating the control signal $M_2(t)$ for performing the aforementioned control in the combined signal analyzing unit 44.

The description in the above preferred embodiment only illustrates an applicable aspect of the present invention, and thus the radio signal demodulating device of the present invention is not limited thereto.

While the invention has been shown and described in detail, the foregoing description is in all aspects illustrative and not restrictive. It is therefore understood that numerous modifications and variations can be devised without departing from the scope of the invention.

The invention claimed is:

1. A radio signal demodulating device receiving as a radio signal in which the amplitude of an information signal, in which known pilot signals are multiplexed, is modulated in proportion to the time change of frequency of a carrier wave, the radio signal demodulating device comprising:

a frequency converting unit receiving said radio signal by a plurality of antennas and converting frequency of said radio signal received in each of said antennas into predetermined frequency so as to output as output signals;

a signal combining unit multiplying each of said output signals obtained by said frequency converting unit by a weight factor so as to output the sum thereof as a combined output signal;

a first pilot signal extracting unit extracting said pilot signals multiplexed in said output signals obtained by said frequency converting unit;

a second pilot signal extracting unit extracting said pilot signals multiplexed in said combined output signals obtained by said signal combining unit;

a first pilot orthogonal signal generating unit generating a signal orthogonal to a first pilot signal obtained by said first pilot signal extracting unit so as to output the signal as a first pilot orthogonal signal which is a complex signal;

a second pilot orthogonal signal generating unit generating a signal orthogonal to a second pilot signal obtained by said second pilot signal extracting unit so as to output the signal as a second pilot orthogonal signal which is a complex signal;

a first error signal generating unit outputting an error of said combined output signal with respect to said known pilot signal as a first error signal by using said second pilot orthogonal signal and a reference signal having the same frequency as said pilot signal; and a first weight factor updating unit calculating said weight factor used in said signal combining unit by using said first pilot orthogonal signal and said first error signal obtained by said first error signal generating unit.

2. The radio signal demodulating device according to claim 1,
   wherein said first pilot orthogonal signal generating unit and said second pilot orthogonal signal generating unit output a first pilot orthogonal signal and second pilot orthogonal signal, which are complex signals, by using a Hilbert transform filter or a differentiator.

3. The radio signal demodulating device according to claim 1,
   wherein said first error signal generating unit outputs a value obtained by complex subtracting said reference signal from said second pilot orthogonal signal, as said first error signal.

4. The radio signal demodulating device according to claim 1,
   wherein said first weight factor updating unit includes a first weight factor holding circuit holding said weight factor, and a first operating unit calculating a difference value updating said weight factor by using said first pilot orthogonal signal and said first error signal so as to update a value of said weight factor by using said difference value with respect to said weight factor held by said first weight factor holding circuit.

5. A radio signal demodulating device receiving as a radio signal in which the amplitude of an information signal, in which known pilot signals are multiplexed, is modulated in proportion to the time change of frequency of a carrier wave, the radio signal demodulating device comprising:

a frequency converting unit receiving said radio signal by a plurality of antennas and converting frequency of said radio signal received in each of said antennas into predetermined frequency so as to output as output signals;

a signal combining unit multiplying each of said output signals obtained by said frequency converting unit by a weight factor so as to output the sum thereof as a combined output signal;

a first pilot signal extracting unit extracting said pilot signals multiplexed in said output signals obtained by said frequency converting unit;

a second pilot signal extracting unit extracting said pilot signals multiplexed in said combined output signals obtained by said signal combining unit;

a first pilot orthogonal signal generating unit generating a signal orthogonal to a first pilot signal obtained by said first pilot signal extracting unit so as to output the signal as a first pilot orthogonal signal which is a complex signal;

a second pilot orthogonal signal generating unit generating a signal orthogonal to a second pilot signal obtained by said second pilot signal extracting unit so as to output the signal as a second pilot orthogonal signal which is a complex signal;

a first error signal generating unit outputting an error of said combined output signal with respect to said known pilot signal as a first error signal by using said second pilot orthogonal signal and a reference signal having the same frequency as said pilot signal;

a first weight factor updating unit calculating said weight factor used in said signal combining unit by using said first pilot orthogonal signal and said first error signal obtained by said first error signal generating unit a power calculating unit calculating a combined power value of said combined output signal;

a second error signal generating unit outputting an error of said combined output signal as a second error signal by using said combined power value obtained by said power calculating unit and a predetermined value;

a second weight factor updating unit calculating a second weight factor by using said output signal obtained by said frequency converting unit, said combined output signal obtained by said signal combining unit, said combined power value obtained by said power calculating unit, and said predetermined value; and a weight factor controlling unit calculating said weight factor used in said signal combining unit from said first weight factor obtained by said first weight factor updating unit and said second weight factor obtained by said second weight factor updating unit on the basis of said first error signal and said second error signal.

6. The radio signal demodulating device according to claim 5, wherein said weight factor controlling unit calculates said weight factor used in said signal combining unit from said first weight factor and said second weight factor on the basis of said combined output signal obtained by said signal combining unit in addition to said first error signal and said second error signal.

7. The radio signal demodulating device according to claim 6, wherein said weight factor controlling unit includes:

a converter outputting converted signals in which said first error signal and said second error signal are converted to an envelope value or a power value of each of those signals;

a combined signal analyzing unit outputting a value obtained by analyzing an envelope value or a power value of said combined output signal, as analyzed signals;

a second control signal generator generating control signals controlling a value of said weight factor outputted to said signal combining unit, from said converted signals and said analyzed signals; and a second weight combiner generating a value of said weight factor outputted to said signal combining unit, from said first weight factor and said second weight factor on the basis of said control signals.

8. The radio signal demodulating device according to claim 5, wherein said second error signal generating unit outputs a value obtained by subtracting said predetermined value from said combined power value, as said second error signal.

9. The radio signal demodulating device according to claim 5, wherein said second weight factor updating unit includes a second weight factor holding circuit holding said second weight factor, and a second operating unit calculating a difference value for updating said second weight factor by using said output signal obtained by said frequency converting unit, said combined output signal, said combined power value, and said predetermined value so as to update a value of said second weight factor by using said difference value with respect to said second weight factor held by said second weight factor holding circuit.

10. The radio signal demodulating device according to claim 5, wherein said weight factor controlling unit includes:

a converter outputting converted signals in which said first error signal and said second error signal are converted to an envelope value or a power value of each of those signals;

a first control signal generator generating control signals controlling a value of said weight factor outputted to said signal combining unit, from said converted signals; and a first weight combiner generating a value of said weight factor outputted to said signal combining unit, from said first weight factor and said second weight factor on the basis of said control signals.

11. he radio signal demodulating device according to any one of claims 1 to 6, wherein said first pilot signal extracting unit includes a first demodulating unit demodulating said output signal obtained by said frequency converting unit so as to generate said information signal, and a first signal extracting unit extracting said pilot signal multiplexed in said output signal from said information signal demodulated in said first demodulating unit, and said second pilot signal extracting unit includes a second demodulating unit demodulating said combined output signal obtained by said signal combining unit so as to generate combined said information signal, and a second signal extracting unit for extracting said pilot signal multiplexed in said combined output signal from combined said information signal in said second demodulating unit.

* * * * *